United States Patent
Wada et al.

(10) Patent No.: US 11,975,972 B2
(45) Date of Patent: May 7, 2024

(54) CARBON MATERIAL AND METHOD FOR PRODUCING SAME, ELECTRODE MATERIAL FOR ELECTRICAL STORAGE DEVICE, AND ELECTRICAL STORAGE DEVICE

(71) Applicant: SEKISUI CHEMICAL CO., LTD., Osaka (JP)

(72) Inventors: Takuya Wada, Osaka (JP); Naoki Sasagawa, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 385 days.

(21) Appl. No.: 17/263,630

(22) PCT Filed: Jul. 30, 2019

(86) PCT No.: PCT/JP2019/029794
§ 371 (c)(1),
(2) Date: Jan. 27, 2021

(87) PCT Pub. No.: WO2020/027111
PCT Pub. Date: Feb. 6, 2020

(65) Prior Publication Data
US 2021/0188647 A1 Jun. 24, 2021

(30) Foreign Application Priority Data
Aug. 3, 2018 (JP) .................................. 2018-146925

(51) Int. Cl.
*C01B 32/21* (2017.01)
*C01B 32/05* (2017.01)
(Continued)

(52) U.S. Cl.
CPC .............. *C01B 32/21* (2017.08); *C01B 32/05* (2017.08); *C01B 32/19* (2017.08); *H01G 11/24* (2013.01);
(Continued)

(58) Field of Classification Search
None
See application file for complete search history.

(56) References Cited

U.S. PATENT DOCUMENTS

2005/0231892 A1   10/2005  Harvey
2010/0002361 A1*  1/2010  Fujino ................... H01G 11/44
361/502
(Continued)

FOREIGN PATENT DOCUMENTS

CN    101717081    6/2010
CN    103395777   11/2013
(Continued)

OTHER PUBLICATIONS

International Search Report issued Oct. 15, 2019 in International (PCT) Application No. PCT/JP2019/029794.
(Continued)

*Primary Examiner* — Ronak C Patel
(74) *Attorney, Agent, or Firm* — Wenderoth, Lind & Ponack, L.L.P.

(57) ABSTRACT

Provided is a carbon material that is large in specific surface area, and moreover, capable of easily forming an electrode film even when any binder is substantially not contained. Provided is a carbon material that has a BET specific surface area of 100 m²/g or more, with the weight of the carbon material remaining on a sieve after shaking being 90% by weight or more with respect to 100% by weight of the carbon material put in the sieve, when 0.2 g of the carbon material packed in a cylindrical syringe of 2 cm in diameter
(Continued)

is compressed at a pressure of 16 kN, the whole of the compressed carbon material is taken out from the syringe and put in the sieve with an aperture of 4.75 mm, and the sieve is shaken for 1 minute.

7 Claims, 3 Drawing Sheets

(51) Int. Cl.
    *C01B 32/19*     (2017.01)
    *H01G 11/24*     (2013.01)
    *H01G 11/42*     (2013.01)
    *H01M 4/587*     (2010.01)
    *H01M 10/0525*     (2010.01)

(52) U.S. Cl.
    CPC ............ *H01G 11/42* (2013.01); *H01M 4/587* (2013.01); *H01M 10/0525* (2013.01); *C01P 2004/03* (2013.01); *C01P 2004/61* (2013.01); *C01P 2004/62* (2013.01); *C01P 2006/12* (2013.01); *C01P 2006/40* (2013.01)

(56) References Cited

U.S. PATENT DOCUMENTS

| | | | |
|---|---|---|---|
| 2010/0220429 | A1 | 9/2010 | Norieda et al. |
| 2012/0003534 | A1 | 1/2012 | Sheem et al. |
| 2013/0216831 | A1 | 8/2013 | Kirschbaum et al. |
| 2013/0319853 | A1* | 12/2013 | Hiltmann ............... C25C 3/08 204/294 |
| 2015/0086766 | A1 | 3/2015 | Kirschbaum et al. |
| 2015/0175778 | A1 | 6/2015 | Nozato et al. |
| 2016/0355403 | A1 | 12/2016 | Kirschbaum et al. |
| 2016/0358718 | A1 | 12/2016 | Fujiwara et al. |
| 2017/0062141 | A1 | 3/2017 | Zhamu et al. |
| 2017/0210876 | A1 | 7/2017 | Nozato et al. |

FOREIGN PATENT DOCUMENTS

| | | |
|---|---|---|
| CN | 106531459 | 3/2017 |
| EP | 3 089 184 | 11/2016 |
| JP | 9-169512 | 6/1997 |
| JP | 2004-315243 | 11/2004 |
| JP | 2007-182358 | 7/2007 |
| JP | 2012-15086 | 1/2012 |
| JP | 2013-521218 | 6/2013 |
| JP | 2017-193474 | 10/2017 |
| WO | 99/43614 | 9/1999 |
| WO | 2007/034873 | 3/2007 |
| WO | 2008/029865 | 3/2008 |
| WO | 2014/034156 | 3/2014 |
| WO | 2015/098758 | 7/2015 |

OTHER PUBLICATIONS

Park et al., "Influence of graphene nanoplatelets content on the structure and properties of macroporous carbon foams prepared by organic colloidal templates", Journal of Materials Science, 2014, vol. 49, Issue 5, pp. 2063-2069.

Translation of the International Preliminary Report on Patentability and Written Opinion of the International Searching Authority issued Feb. 18, 2021 in International (PCT) Application No. PCT/JP2019/029794.

Communication pursuant to Rule 164(1) EPC issued in Apr. 8, 2022 in European Patent Application No. 19844835.9.

Barzegar, Farshad et al., "Preparation and characterization of porous carbon from expanded graphite for high energy density supercapacitor in aqueous electrolyte", Journal of Power Sources, vol. 309, Mar. 1, 2016, pp. 245-253, XP055776212.

Zhu, Hongfa, "A Handbook of Catalysts", Jindun Publishing House, (Aug. 31, 2008), pp. 85, with English machine translation.

* cited by examiner

[FIG. 1]
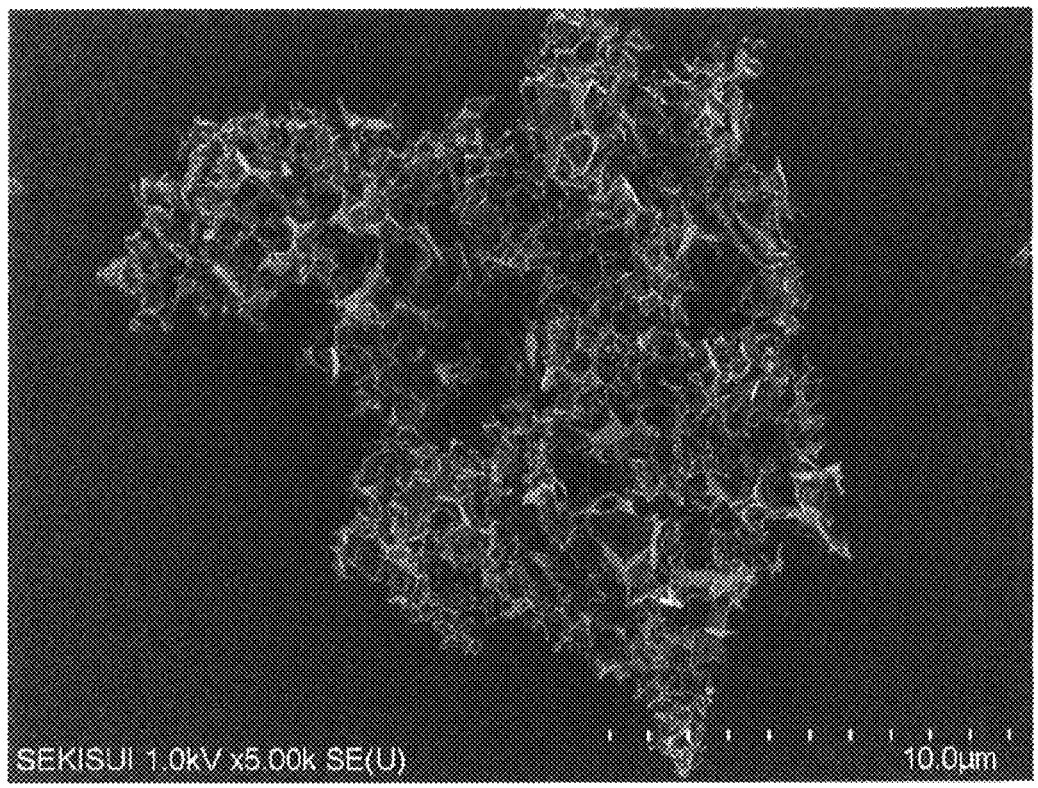
[FIG. 2]
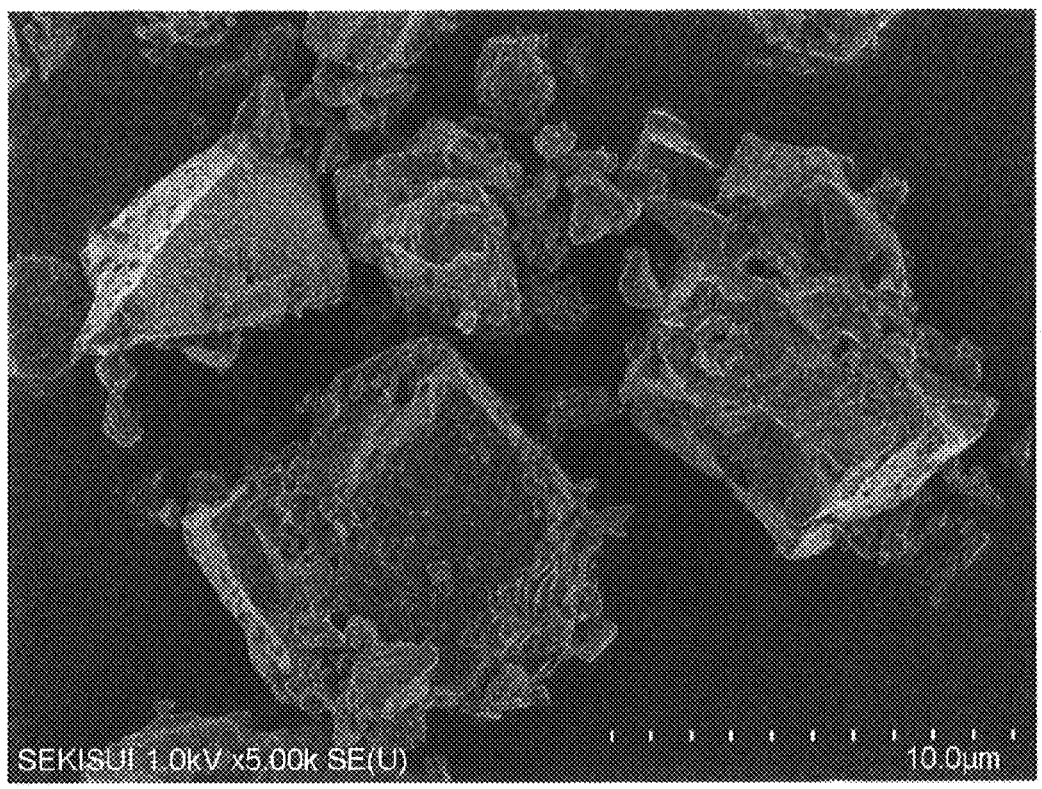

[FIG. 3]
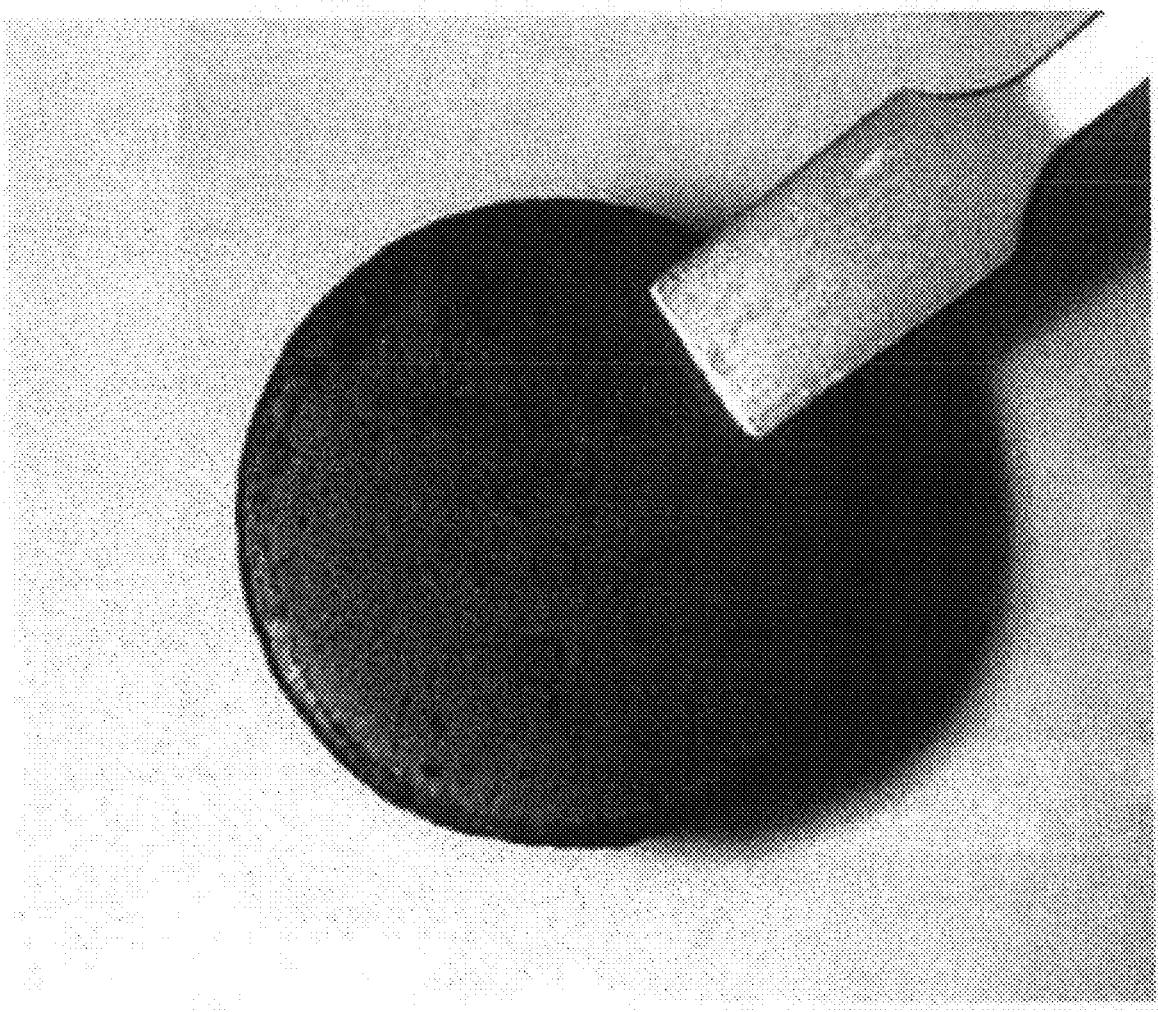

[FIG. 4]
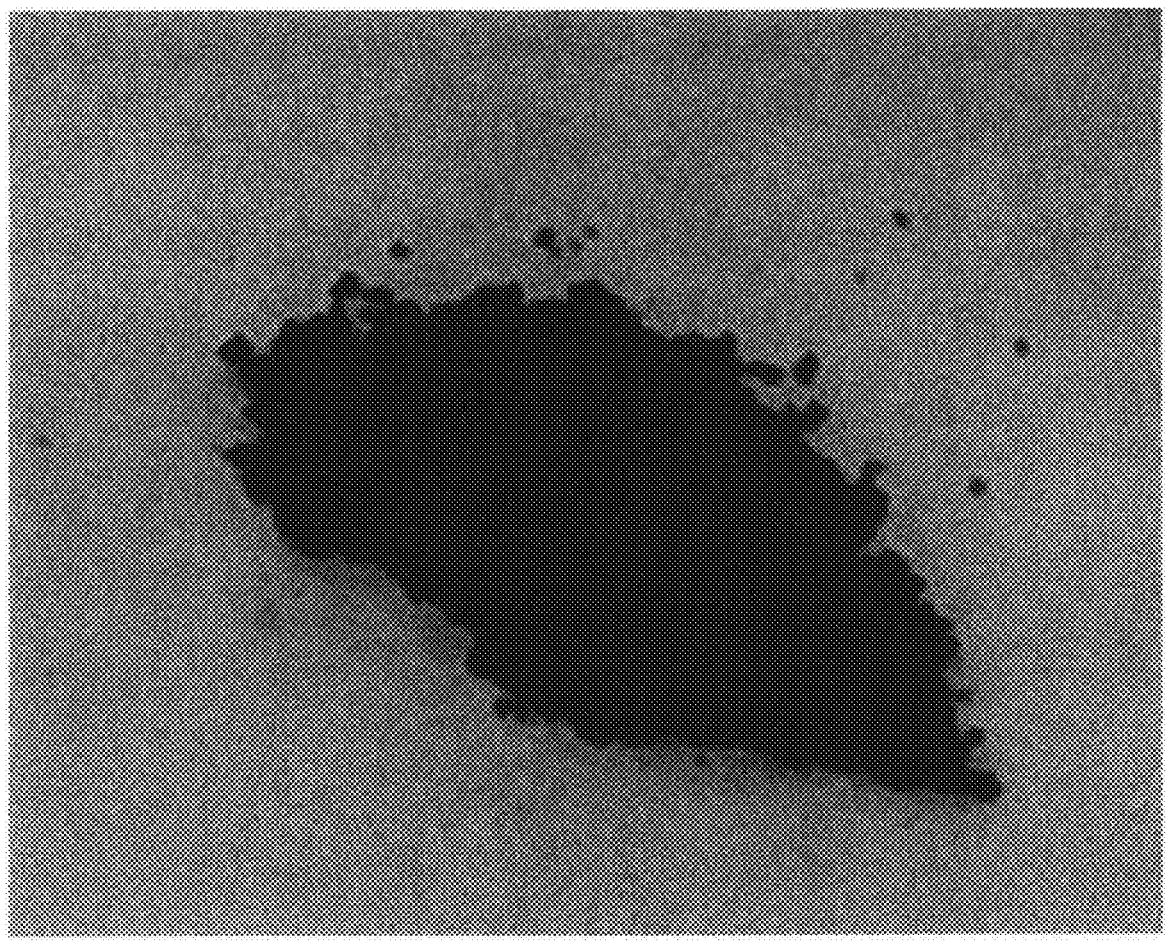

CARBON MATERIAL AND METHOD FOR PRODUCING SAME, ELECTRODE MATERIAL FOR ELECTRICAL STORAGE DEVICE, AND ELECTRICAL STORAGE DEVICE

TECHNICAL FIELD

The present invention relates to a carbon material, a method for producing the carbon material, and an electrode material for an electrical storage device and an electrical storage device with the carbon material used.

BACKGROUND ART

In recent years, electrical storage devices have been actively researched and developed for mobile devices, hybrid vehicles, electric vehicles, household electrical storage applications, and the like. Carbon materials such as graphite, activated carbon, carbon nanofibers, and carbon nanotubes are widely used as electrode materials for electrical storage devices from the environmental aspect.

Patent Document 1 below discloses an electric double layer capacitor including a polar electrode layer containing activated carbon, a conductive aid, and a binder. The binder takes a role for binding a current collector and an active material in an electrode. Further, the binder also takes a role for binding active materials to each other.

RELATED ART DOCUMENT

Patent Document

Patent Document 1: International Publication No. 2008-029865

SUMMARY OF THE INVENTION

Problems to be Solved by the Invention

In recent years, further improvement of battery characteristics has been required in the field of electrical storage devices such as capacitors and lithium ion secondary batteries. However, when a binder is used as an electrode material for an electrical storage device as in Patent Document 1, the internal resistance may be increased, thereby degrading the battery performance such as cycle characteristics. In addition, the battery performance may be degraded depending on side reactions or decomposition of the binder. Accordingly, it is desirable to reduce the amount of the binder added in the electrode material for the electrical storage device.

However, when activated carbon as in Patent Document 1 is used as an electrode material for an electrical storage device, there is a problem that it is difficult to form an electrode film unless the amount of the binder added is increased. In particular, when a carbon material with a large specific surface area is used for the electrode material in order to enhance the battery characteristics such as the capacity of an electrical storage device, the tendency was remarkable.

An object of the present invention is to provide a carbon material that is large in specific surface area, and moreover, capable of can easily forming an electrode film even when any binder is substantially not contained, a method for producing the carbon material, and an electrode material for an electrical storage device and an electrical storage device with the carbon material used.

Means for Solving the Problems

A broad aspect of a carbon material according to the present invention is a carbon material that has a BET specific surface area of 100 $m^2/g$ or more, with the weight of the carbon material remaining on a sieve after shaking being 90% by weight or more with respect to 100% by weight of the carbon material put in the sieve, when 0.2 g of the carbon material packed in a cylindrical syringe of 2 cm in diameter is compressed at a pressure of 16 kN, the whole of the compressed carbon material is taken out from the syringe and put in the sieve with an aperture of 4.75 mm, and the sieve is shaken for 1 minute.

In a specific aspect of the carbon material according to the present invention, the carbon material includes a plurality of recesses and a plurality of protrusions.

In another specific aspect of the carbon material according to the present invention, the plurality of protrusions are protrusions that fit into the plurality of recesses.

In another specific aspect of the carbon material according to the present invention, the carbon material contains a carbide of a resin.

In yet another specific aspect of the carbon material according to the present invention, the carbon material includes a carbon material that has a graphene laminated structure. Preferably, the carbon material that has the graphene laminated structure is graphite or exfoliated graphite. More preferably, the graphite or exfoliated graphite is partially exfoliated graphite which has a graphite structure and in which graphite is partially exfoliated.

A broad aspect of a method for producing a carbon material according to the present invention is a method for producing a carbon material, which includes: a step of mixing graphite or primary exfoliated graphite with a resin to obtain a first mixture; a step of adding different particles from the carbon material to the first mixture and disposing the particles in a matrix of the carbon material constituting the first mixture to form a second mixture; a heating step of heating the second mixture at a temperature of 200° C. or higher and 1000° C. or lower; and a step of removing the particles from the second mixture heated.

Another broad aspect of a method for producing a carbon material according to the present invention is a method for producing a carbon material, which includes: a step of adding different particles from the carbon material to a resin and disposing the particles in a matrix of the resin to form a mixture; a heating step of heating the mixture at a temperature of 200° C. or higher and 1000° C. or lower; and a step of removing the particles from the mixture heated.

Another broad aspect of a method for producing a carbon material according to the present invention is a method for producing a carbon material, which includes: a step of mixing graphite or primary exfoliated graphite with a resin to obtain a first mixture; a step of adding different particles from the carbon material to the first mixture and coating the particles in with the carbon material constituting the first mixture to form a second mixture; a heating step of heating the second mixture at a temperature of 200° C. or higher and 1000° C. or lower; and a step of removing the particles from the second mixture heated.

Another broad aspect of a method for producing a carbon material according to the present invention is a method for producing a carbon material, which includes: a step of adding different particles from the carbon material to a resin and coating the particles in with the resin to form a mixture; a heating step of heating the mixture at a temperature of 200° C. or higher and 1000° C. or lower; and a step of removing the particles from the mixture heated.

In a specific aspect of the method for producing a carbon material according to the present invention, the heating step is a step of carbonizing at least a part of the resin.

In another specific aspect of the method for producing a carbon material according to the present invention, the step of removing the particles is a step of removing the particles with a solvent.

In yet another specific aspect of the method for producing a carbon material according to the present invention, the particles have an average particle size of 0.1 μm or more and 1000 μm or less.

In another broad aspect of the carbon material according to the present invention, the carbon material is obtained by the method for producing a carbon material configured according to the present invention.

An electrode material for an electrical storage device according to the present invention includes a carbon material configured according to the present invention.

An electrical storage device according to the present invention includes an electrode made from the electrode material for an electrical storage device configured according to the present invention.

Effect of the Invention

The present invention can provide a carbon material that is large in specific surface area, and moreover, capable of easily forming an electrode film even when any binder is substantially not contained, a method for producing the carbon material, and an electrode material for an electrical storage device and an electrical storage device with the carbon material used.

BRIEF DESCRIPTION OF DRAWINGS

FIG. 1 is a scanning electron microscope (SEM) photograph showing a carbon material obtained in Example 2 at a magnification of 5000.

FIG. 2 is a scanning electron microscope (SEM) photograph showing a carbon material according to Comparative Example 3 at a magnification of 5000.

FIG. 3 is a photograph showing the carbon material after the application of pressure in Example 2.

FIG. 4 is a photograph showing the carbon material after the application of pressure in Comparative Example 3.

MODE FOR CARRYING OUT THE INVENTION

Hereinafter, the details of the present invention will be described.

(Carbon Material)

The carbon material according to the present invention has a BET specific surface area of 100 m²/g or more. In addition, 0.2 g of the carbon material packed in a cylindrical syringe of 2 cm in diameter is compressed at a pressure of 16 kN, and the whole of the compressed carbon material is taken out from the syringe and put into a sieve with an aperture of 4.75 mm. When the sieve is shaken for 1 minute after the material is input, the weight of the carbon material remaining on the sieve after the shaking is 90% by weight or more with respect to 100% by weight of the carbon material put into the sieve. Accordingly, the carbon material according to the present invention is capable of forming a self-supporting film through the above-mentioned compression at 16 kN substantially without containing any binder. It is to be noted that "substantially without containing any binder" means that the content of the binder is 1% by weight or less with respect to 100% by weight of the material that forms the film.

The carbon material of the present invention has a BET specific surface area of 100 m²/g or more, thus making it possible to improve battery characteristics such as the capacity of an electrical storage device. Furthermore, the carbon material according to the present invention is, because the evaluation of the sieve falls within the above range, easily capable of forming an electrode film substantially without containing any binder. Further, the carbon material according to the present invention preferably includes a plurality of recesses and a plurality of protrusions. In particular, the plurality of recesses and the plurality of protrusions are more preferably fitted into each other by pressurization. In that case, the electrode film can be formed more easily.

The carbon material according to the present invention allows the amount of the binder added in the electrode film to be reduced, thus allowing the electrode resistance inside the battery or capacitor to be reduced. In addition, the amount of the binder added can be reduced, thus making side reactions and decomposition of the binder unlikely to be caused. Accordingly, the battery characteristics of the electrical storage device can be improved. Furthermore, the BET specific surface area falls within the range mentioned above, thus allowing battery characteristics such as a capacity to be improved.

The BET specific surface area can be calculated from a nitrogen adsorption isotherm in accordance with the BET method. As the measurement device, for example, a specific surface area measurement device (from Shimadzu Corporation, product number "ASAP-2000") can be used.

Since a sample that has a large BET specific surface area easily absorbs moisture in the air, the adsorbed moisture and fat and the like are desirably vaporized and removed in advance by vacuum drying at 300° C. for 1 hour. The basal condition for the sample for use in the measurement is about 100 mg, but the sample is desirably adjusted for use appropriately in the range of 50 mg to 200 mg depending on the BET specific surface area.

In addition, the shapes and sizes of the plurality of recesses and the plurality of protrusions are not particularly limited as long as a self-supporting film can be formed.

When the plurality of recesses each has a substantially circular planar shape, the diameter of the recess is preferably 0.1 μm or more and 1000 μm or less. When the plurality of recesses each has a substantially elliptical planar shape, the major axis of the recess is preferably 0.1 μm or more and 1000 μm or less. When the plurality of recesses each has a substantially rectangular planar shape, the long side of the recess is preferably 0.1 μm or more and 1000 μm or less. In addition, the plurality of recesses preferably has a depth of 0.1 μm or more and 1000 μm or less. When the shapes and sizes of the plurality of recesses respectively fall within the ranges mentioned above, a self-supporting film can be formed more easily by fitting the plurality of protrusions and the plurality of recesses into each other.

When the plurality of protrusions each has a substantially circular planar shape, the diameter of the protrusion is preferably 0.1 μm or more and 1000 μm or less. When the plurality of protrusions each has a substantially elliptical planar shape, the major axis of the protrusion is preferably 0.1 μm or more and 1000 μm or less. When the plurality of protrusions each has a substantially rectangular planar shape, the long side of the protrusion is preferably 0.1 µm or more and 1000 µm or less. Further, the height of the protruding part in the protrusion is preferably 0.1 µm or more and 1000 µm or less. When the shapes and sizes of the plurality of protrusions respectively fall within the ranges mentioned above, a self-supporting film can be formed more easily by fitting the plurality of protrusions and the plurality of recesses into each other.

The carbon material according to the present invention is preferably a porous solid. In this case, the plurality of recesses is considered to correspond to the respective holes of the porous solid.

The carbon material according to the present invention preferably has a BET specific surface area of 240 $m^2/g$ or more, more preferably 450 $m^2/g$ or more, further preferably 1100 $m^2/g$ or more, and preferably 4000 $m^2/g$ or less, more preferably 3500 $m^2/g$ or less. When the BET specific surface area falls within the range mentioned above, battery characteristics such as the capacity of the electrical storage device can be further improved.

The carbon material according to the present invention may be provided with pores such as mesopores. It is to be noted that the mesopore refers to a pore that has a pore diameter of 2 nm or more and 50 nm or less. The volume of the mesopores refers to the sum of the volumes of all of the mesopores in the carbon material (total mesopore volume). The volume of the mesopores can be measured by, for example, the BJH (Barret, Joyner, Hallender) method, which is a gas adsorption method.

The volume of the mesopores is preferably 0.04 mL/g or more, more preferably 0.05 mL/g or more, further preferably 0.1 mL/g or more. The upper limit of the volume of the mesopore is not particularly limited, but is preferably 20 mL/g or less, more preferably 1 mL/g or less. When the volume of the mesopores is equal to or more than the lower limit mentioned above, an electrolytic solution is more likely to penetrate the surface of the carbon material, the large specific surface area can be utilized more effectively, and the capacity of the electrical storage device can be thus further increased.

The carbon material according to the present invention may be provided with pores such as micropores besides the mesopores. The volume of the micropores is preferably 1.0 mL/g or less, more preferably 0.8 mL/g or less. The lower limit of the volume of the micropores is not particularly limited, but is preferably 0.01 mL/g or more. The micropores contribute to the improvement of the specific surface area, but have small pore diameters, and thus, an electrolytic solution is unlikely to penetrate in the micropores, and the micropores are considered to have a surface area that is unlikely to be utilized as a battery. When the volume of the micropores is equal to or less than the upper limit mentioned above, an electrolytic solution is more likely to penetrate the surface of the carbon material, the large specific surface area can be utilized effectively, and the capacity of the electrical storage device can be thus further increased.

It is to be noted that the micropore refers to a pore with a pore diameter of less than 2 nm. The volume of the micropores can be measured by, for example, the MP (Micropore Analysis) method, which is a gas adsorption method. In addition, the volume of the micropores refers to the sum of the volumes of all of the micropores in the carbon material.

The carbon material according to the present invention may contain a carbide of a resin. The carbide of the resin may be amorphous carbon. When amorphous carbon alone is subjected to measurement by an X-ray diffraction method, no peak is preferably detected around 26° of 2 θ. It is to be noted that the resin may partially remain without being carbonized. Further, the resin is used for the purpose of forming the carbide, and thus considered distinguished from the binder for use in the electrode material for the electrical storage device.

In addition, examples of the resin used for the carbide of the resin include a polypropylene glycol, a polyethylene glycol, a styrene polymer (polystyrene), a vinyl acetate polymer (polyvinyl acetate), a polyglycidyl methacrylate, a polyvinyl butyral, a polyacrylic acid, a styrene butadiene rubber, a polyimide resin, and fluoropolymers such as a polytetrafluoroethylene and a polyvinylidene fluoride. It is to be noted that the above-mentioned resins may be used alone, or two or more thereof may be used in combination. Preferably, a polyethylene glycol or a polyvinyl acetate is employed, In the present invention, the content of the resin and/or the carbide of the resin contained in 100% by weight of the carbon material is preferably 1% by weight or more, more preferably 3% by weight or more, further preferably 10% by weight or more, particularly preferably 15% by weight or more, and preferably 99% by weight or less, more preferably 95% by weight or less. The content of the resin and/or the carbide of the resin is adjusted to be equal to or more than the lower limit and equal to or less than the upper limit, thereby allowing the battery characteristics of the electrical storage device to be further enhanced.

The carbon material according to the present invention preferably contains a carbon material that has a graphene laminated structure. In this case, the conductivity can be further enhanced. Thus, when the carbon material is used as an electrode material for an electrical storage device, battery characteristics such as rate characteristics can be further improved.

It is to be noted that the carbon material according to the present invention may be composed only of the carbon material that has a graphene laminated structure, or may be composed only of the carbide of the resin. Further, the carbon material may be a mixture of the carbon material that has a graphene laminated structure and the carbide of the resin. Further, the carbon material according to the present invention may further contain the resin remaining without being carbonized.

Further, whether to have a graphene laminated structure or not can be confirmed by whether a peak around 2 θ=26° (derived from the graphene laminated structure) is observed or not when the X-ray diffraction spectrum of the carbon material is measured with the use of a CuKα line (wavelength: 1.541 Å). The X-ray diffraction spectrum can be measured by a wide-angle X-ray diffraction method. As the X-ray diffractometer, for example, SmartLab (from Rigaku Corporation) can be used.

Further, the carbon material according to the present invention may be a composite of the carbide of the resin and the carbon material that has a graphene laminated structure. In this case, when the composite is subjected to measurement by the X-ray diffraction method, the peak around 2 θ of 26° changes in intensity depending on the compounding ratio between amorphous carbon, as the carbide of the resin, and crystalline graphite. It is to be noted that even in this case, the resin may partially remain without being carbonized.

In the present invention, examples of the carbon material that has a graphene laminated structure include graphite and exfoliated graphite.

Graphite is a laminate of a plurality of graphene sheets. The number of laminated graphene sheets of graphite is typically about 100,000 to 1,000,000. As the graphite, for example, natural graphite, artificial graphite, expanded graphite, or the like can be used. Expanded graphite has a higher proportion of increased interlayer distance between graphene layers than ordinary graphite. Accordingly, it is preferable to use expanded graphite as the graphite.

Exfoliated graphite, which is obtained by subjecting original graphite to a peeling treatment, refers to a graphene sheet laminate that is thinner than the original graphite. The number of laminated graphene sheets in exfoliated graphite has only to be smaller than that of the original graphite. It is to be noted that the exfoliated graphite may be oxidized exfoliated graphite.

For the exfoliated graphite, the number of graphene sheets laminated is not particularly limited, but is preferably 2 or more, more preferably 5 or more, and preferably 1000 or less, more preferably 500 or less. When the number of graphene sheets laminated is equal to or more than the lower limit mentioned above, the exfoliated graphite is kept from being scrolled in the liquid, and the exfoliated graphite is kept from being stacked on top of one another, and the conductivity of the exfoliated graphite can be thus further enhanced. When the number of graphene sheets laminated is equal to or less than the upper limit mentioned above, the specific surface area of the exfoliated graphite can be further increased.

Further, the exfoliated graphite is preferably partially exfoliated graphite having a structure in which graphite is partially exfoliated.

More specifically, the term "graphite being partially exfoliated" means that the graphene laminate has an opening between the graphene layers from the end edge to the inside to some extent, that is, the graphite is partially exfoliated at the end edge (edge part). Further, the term means that the graphite layers are laminated in the central part in the same manner as the original graphite or the primary exfoliated graphite. Accordingly, the part where graphite is partially exfoliated at the end edge is continuous with the central part. Furthermore, the partially exfoliated graphite may include graphite peeled off and exfoliated at the end edge.

As described above, the partially exfoliated graphite has graphite layers laminated in the central part in the same manner as the original graphite or the primary exfoliated graphite. For that reason, the graphite has a higher degree of graphitization than conventional graphene oxides and carbon black, with excellent conductivity. Accordingly, when the graphite is used as an electrode for an electrical storage device, the electron conductivity in the electrode can be further increased, thereby allowing charge/discharge with a larger current.

Further, whether graphite is partially exfoliated or not can be determined by, for example, observation with a scanning electron microscope (SEM), or from an X-ray diffraction spectrum, as in the case of the exfoliated graphite-resin composite material described in International Publication No, 2014/034156.

(Method for Producing Carbon Material)

First and second methods will be described below as examples of the method for producing the carbon material according to the present invention.

First Method;

In the first method, first, graphite or primary exfoliated graphite and a resin are mixed to obtain a first mixture (mixing step). It is to be noted that the mixing method is not particularly limited, and for example, methods can be used, such as mixing with ultrasonic waves, mixing with a mixer, mixing with a stirrer, and putting graphite or primary exfoliated graphite and a resin in a sealable container and shaking the container.

The mixing ratio between the graphite or primary exfoliated graphite and the resin (graphite or primary exfoliated graphite/resin) is preferably 1/1000 or more, more preferably 1/300 or more, and preferably 1/3 or less, more preferably 1/5 or less in terms of ratio by mass.

Further, in this mixing step, a solvent or the like may be further added. As the solvent, for example, water, ethanol, methanol, THF (tetrahydrofuran), NMP (N-methyl-2-pyrrolidone), and the like can be used. The first mixture obtained in this mixing step is desirably a mixed liquid.

Next, the mixture is dried. The drying method is not particularly limited, and for example, methods of air drying, hot plate, vacuum drying, and freeze drying can be used. It is to be noted that the dried product of the mixed liquid is also preferably a liquid. Further, in the mixing step, a dispersant such as a carboxymethyl cellulose (CMC) or a sodium dodecyl sulfate (SDS) may be further mixed.

The mixing ratio (resin:solvent) between the resin and the solvent can be, for example, 20:80 to 100:0 in terms of ratio by mass. Further, the mixing ratio (resin:dispersant) between the resin and the dispersant can be, for example, 80:20 to 100:0 in terms of ratio by mass.

It is to be noted that as the graphite, it is preferable to use expanded graphite because the graphite can be peeled off more easily in the heating step described later. Further, the primary exfoliated graphite mentioned above broadly includes exfoliated graphite obtained by peeling off graphite by various methods. The primary exfoliated graphite may be partially exfoliated graphite. The primary exfoliated graphite is obtained by peeling off graphite, and thus has only to be larger in specific surface area than graphite.

The resin is not particularly limited, and examples thereof include a polypropylene glycol, a polyethylene glycol, a polyglycidyl methacrylate, a vinyl acetate polymer (polyvinyl acetate), a polyvinyl butyral, a polyacrylic acid, a styrene polymer (polystyrene), a styrene butadiene rubber, a polyimide resin, and fluoropolymers such as a polytetrafluoroethylene, a polyvinylidene fluoride. It is to be noted that the resin used here is a resin that is used for producing the carbon material, and is considered distinguished from a binder for use as a binder. Most of the resin used here is carbonized by the heating described later.

Next, to the obtained dried product of the first mixture, different particles from the carbon material are further added, and mixed. The different particles from the carbon material are disposed in the matrix of the carbon material constituting the first mixture, thereby forming a second mixture. Alternatively, the different particles from the carbon material may be coated with a carbon material constituting the second mixture, thereby forming the second mixture. It is to be noted that the mixing method is not particularly limited, and examples thereof include methods such as mixing with ultrasonic waves, mixing with a mixer, mixing with a stirrer, and putting the dried product of the first mixture and the particles in a sealable container and shaking the container.

The mixing ratio (graphite or primary exfoliated graphite/different particles from carbon material) between the graphite or primary exfoliated graphite and the different particles from the carbon material is preferably 0/100 or more, more preferably 1/99 or more, and preferably 50/50 or less, more preferably 30/70 or less in terms of ratio by mass.

The different particles from the carbon material may be an activator. The different particles from the carbon material are not particularly limited, but for example, a zinc hydroxide, a zinc chloride, a zinc sulfide, a calcium hydroxide, a calcium chloride, a calcium sulfide, a calcium carbonate, a sodium hydroxide, a sodium chloride, a sodium sulfide, a sodium carbonate, a potassium hydroxide, a potassium chloride, a potassium sulfide, a potassium carbonate, a phosphoric acid, a zinc phosphate, a calcium phosphate, a sodium phosphate, and a potassium phosphate can be used. These may be used alone, or two or more thereof may be used in combination.

The different particles from the carbon material are preferably 0.1 µm or more and 1000 µm or less in particle size. The different particles from the carbon material is more preferably 1 µm or more, further preferably 10 µm or more, and more preferably 500 µm or less, further preferably 300 µm or less in particle size. The particle sizes of the different particles from the carbon material within the range mentioned above allows the obtained carbon material to form a self-supporting film more easily, It is to be noted that the particle size refers to an average particle size calculated from a volumetric basis distribution by a dry laser diffraction method. The average particle size can be measured with the use of, for example, MT3000II from MicrotracBEL Corp.

Next, the second mixture is heated (heating step). The heating temperature in the heating step can be, for example, 200° C. to 1000° C. The heating may be performed in the atmosphere, or under an atmosphere of an inert gas such as a nitrogen gas. This heating step desirably carbonizes at least a part of the resin. The resin may be completely carbonized. Further, in this heating step, the graphite of the graphite or primary exfoliated graphite may be partially exfoliated to obtain the partially exfoliated graphite described above. Further, after this heating step, an activation treatment may be further performed by a chemical activation method or a gas activation method.

Next, the above-mentioned particles are removed from the second mixture heated. In this regard, the sites from which the particles disposed in the matrix of the second mixture have been removed serve as the plurality of recesses and the plurality of protrusions. It is to be noted that the method for removing the particles is not particularly limited, and examples thereof include a method of washing with a solvent such as water and drying.

The carbon material obtained by such a production method includes the plurality of recesses and the plurality of protrusions. Further, the weight of the carbon material remaining on the sieve after the shaking described above can be 90% by weight or more with respect to 100% by weight of the carbon material put into the sieve. Accordingly, the electrode film can be easily formed even when the amount of the binder added is reduced.

It is to be noted that the weight of the carbon material remaining on the sieve after the shaking described above can be increased by, for example, making the amount of the resin to be mixed and the amount of the different particles from the carbon material close to the same amount in terms of volume ratio, reducing the particle sizes of the different particles from the carbon material, washing well such that the different particles from the carbon material will not remain when the different particles from the carbon material are removed from the second mixture, or making the grinding time after washing longer.

Further, the first method makes it possible to provide a carbon material that is a composite material of a carbon material that has a graphene laminated structure, such as original graphite or primary exfoliated graphite, or partially exfoliated graphite, and a resin and/or a carbide of the resin.

Second Method;

In the second method, first, different particles from the carbon material are added to and mixed with the resin to serve as a matrix. Thus, the different particles from the carbon material are disposed in the resin matrix to form a mixture. Alternatively, the different particles from the carbon material may be coated with the resin to form a mixture. It is to be noted that the mixing method is not particularly limited, and examples thereof include methods such as mixing with ultrasonic waves, mixing with a mixer, mixing with a stirrer, and putting the resin and the particles in a sealable container and shaking the container.

The mixing ratio (resin/different particles from carbon material) between the resin and the different particles from the carbon material is preferably 1/100 or more, more preferably 10/90 or more, and preferably 1000/1 or less, more preferably 500/1 or less in terms of ratio by mass.

As the resin, it is preferable to use a liquid resin. The resin is not particularly limited, and examples thereof include a polypropylene glycol, a polyethylene glycol, a polyglycidyl methacrylate, a vinyl acetate polymer (polyvinyl acetate), a polyvinyl butyral, a polyacrylic acid, a styrene polymer (polystyrene), a styrene butadiene rubber, a polyimide resin, and fluoropolymers such as a polytetrafluoroethylene, a polyvinylidene fluoride. It is to be noted that the resin used here is a resin that is used for producing the carbon material, and is considered distinguished from a binder for use as a binder. Most of the resin used here is carbonized by the heating described later.

The different particles from the carbon material may be an activator. The different particles from the carbon material are not particularly limited, but for example, a zinc hydroxide, a zinc chloride, a zinc sulfide, a calcium hydroxide, a calcium chloride, a calcium sulfide, a calcium carbonate, a sodium hydroxide, a sodium chloride, a sodium sulfide, a sodium carbonate, a potassium hydroxide, a potassium chloride, a potassium sulfide, a potassium carbonate, a phosphoric acid, a zinc phosphate, a calcium phosphate, a sodium phosphate, and a potassium phosphate can be used. These may be used alone, or two or more thereof may be used in combination.

The different particles from the carbon material are preferably 0.1 µm or more and 1000 µm or less in particle size. The different particles from the carbon material is more preferably 1 µm or more, further preferably 10 µm or more, and more preferably 500 µm or less, further preferably 300 µm or less in particle size. The particle sizes of the different particles from the carbon material within the range mentioned above allows the obtained carbon material to form a self-supporting film more easily. It is to be noted that the average particle size refers to an average particle size calculated from a volumetric basis distribution by a dry laser diffraction method. The average particle size can be measured with the use of, for example, MT3000II from MicrotracBEL Corp, Next, the above-mentioned mixture is heated (heating step). The heating temperature in the heating step can be, for example, 200° C. to 1000° C. The heating may be performed in the atmosphere, or under an atmosphere of an inert gas such as a nitrogen gas. This heating step desirably carbonizes at least a part of the resin. Further, after this heating step, an activation treatment may be further performed by a chemical activation method or a gas activation method.

Next, the particles are removed from the mixture heated. In this regard, the sites from which the particles disposed in the matrix have been removed serve as the plurality of recesses and the plurality of protrusions. It is to be noted that the method for removing the particles is not particularly limited, and examples thereof include a method of washing with a solvent such as water and drying.

The carbon material obtained by the second method also includes the plurality of recesses and the plurality of protrusions. Further, the weight of the carbon material remaining on the sieve after the shaking described above can be 90% by weight or more with respect to 100% by weight of the carbon material put into the sieve. Accordingly, the electrode film can be easily formed even when the amount of the binder added is reduced.

It is to be noted that the weight of the carbon material remaining on the sieve after the shaking described above can be increased by making the amount of the resin to be mixed and the amount of the different particles from the carbon material close to the same amount in terms of volume ratio, reducing the particle sizes of the different particles from the carbon material, washing well such that the different particles from the carbon material will not remain when the different particles from the carbon material are removed from the second mixture, or making the grinding time after washing longer.

Accordingly, as the starting material, a mixture of graphite or primary exfoliated graphite and a resin may be used as in the first method, or a resin may be used alone without using graphite or primary exfoliated graphite as in the second method.

Further, the second method makes it possible provide a carbon material composed of only a carbides of the resin. The carbon material may, however, further contain a non-carbonized resin.

The carbon material according to the present invention is capable of easily forming an electrode film even if the amount of the binder added is reduced, and capable of enhancing battery characteristics such as the capacity of an electrical storage device. Accordingly, the carbon material according to the present invention can be suitably used as an electrode material for an electrical storage device.

(Electrode Material for Electrical Storage Device and Electrical Storage Device)

The electrical storage device according to the present invention is not particularly limited, and examples thereof include a non-aqueous electrolyte primary battery, an aqueous electrolyte primary battery, a non-aqueous electrolyte secondary battery, an aqueous electrolyte secondary battery, a capacitor, an electric double layer capacitor, and a lithium ion capacitor. The electrode material for an electrical storage device according to the present invention is an electrode material for use in an electrode of such an electrical storage device as mentioned above.

The electrical storage device according to the present invention includes an electrode composed of the electrode material for an electrical storage device, containing the carbon material according to the present invention, thus making it possible to enhance battery characteristics such as the capacity of the electrical storage device.

In particular, the carbon material contained in the electrode material for an electrical storage device can effectively increase the capacity of a capacitor or a lithium ion secondary battery. Further, examples of the capacitor include an electric double layer capacitor.

It is to be noted that the electrode material for an electrical storage device is obtained by shaping the carbon material according to the present invention, including therein a binder and a solvent, if necessary, thereby allowing for use as an electrode for an electrical storage device. However, the amount of the binder added may be reduced, or no binder may be contained. The amount of the binder added is preferably 5% by weight or less, further preferably 3% by weight or less, further preferably 1% by weight or less, with respect to 100% by weight of the electrode material for the electrical storage device.

The electrode material for an electrical storage device can be shaped, for example, by forming a sheet with a rolling roller and then drying the sheet. Alternatively, a current collector may be coated with a coating liquid composed of the carbon material according to the present invention, a solvent, and, if necessary, a binder, and then subjected to drying.

As the binder, for example, resins can be used, such as polyvinyl butyrals, fluorine-based polymers, e.g., polytetrafluoroethylene, styrene-butadiene rubbers, polyimide resins, acrylic resins, and polyvinylidene fluorides, and water-soluble carboxymethyl celluloses. Preferably, polytetrafluoroethylene can be used. When polytetrafluoroethylene is used, the dispersibility and the heat resistance can be further improved.

Further, as the solvent, ethanol, N-methylpyrrolidone (NMP), water, or the like can be used.

When the electrical storage device is used for a capacitor, an aqueous system or a non-aqueous (organic) system may be used as an electrolytic solution for the capacitor.

Examples of the aqueous electrolytic solution include an electrolytic solution in which water is used as a solvent and a sulfuric acid, a potassium hydroxide, or the like is used as an electrolyte.

In contrast, as the non-aqueous electrolytic solution, for example, an electrolytic solution in which the following solvent, electrolyte, and ionic liquid can be used. Specific examples of the solvent include acetonitrile, propylene carbonate (PC), ethylene carbonate (EC), dimethyl carbonate (DMC), diethyl carbonate (DEC), or acrylonitrile (AN).

In addition, examples of the electrolyte include a lithium hexafluorophosphate ($LiPF_6$), a lithium tetrafluoroborate ($LiBF_4$), a tetraethylammonium tetrafluoroborate ($TEABF_4$), and a triethylmethylammonium tetrafluoroborate ($TEMABF_4$).

Furthermore, as the ionic liquid, for example, an ionic liquid with the following cation and anion can be used. Examples of the cation include an imidazolium ion, a pyridinium ion, an ammonium ion, and a phosphonium ion, Examples of the anion include a tetrafluoroborate ion ($BF_4^-$), a hexafluoroborate ion ($BF_6^-$), a tetrachloroaluminum ion ($AlCl_4^-$), a hexafluorotantalum ion ($TaF_6^-$), and a tris(trifluoromethanesulfonyl)methane ion ($C(CF_3SO_2)_3^-$). When the ionic liquid is used, the drive voltage can be further improved in the electrical storage device. More specifically, the energy density can be further improved.

Next, the present invention will be clarified by providing specific examples and comparative examples of the present invention. It is to be noted that the present invention is not to be considered limited to the examples below.

EXAMPLE 1

To 1 g of a polyethylene glycol (PEG, molecular weight: 600, from Sanyo Chemical Industries, Ltd.), 2 g of a potassium carbonate ($K_2CO_3$, from Wako Pure Chemical Industries, Ltd., average particle size; 600 μm) as an activator was added, and homogeneously mixed with the use of a mill. Furthermore, the obtained mixture was kept at a temperature of 370° C. (carbonization temperature) for 1 hour under a nitrogen atmosphere, then heated to 800° C., and held at a temperature (activation temperature) of 800° C. for 1 hour to carry out an activation treatment. Finally, a carbon material was obtained by washing with hot water to neutrality.

EXAMPLE 2

A graphite dispersion was prepared by mixing 1 g of expanded graphite (from Toyo Tanso Co., Ltd., trade name "PF powder 8", BET specific surface area=22 m²/g), 3 g of a 1% aqueous solution of a carboxymethyl cellulose (CMC, molecular weight: 250,000, from Aldrich) as a dispersant, and 30 g of water as a solvent. The prepared graphite dispersion was irradiated with ultrasonic waves at 100 W and an oscillation frequency: 28 kHz for 6 hours with the use of an ultrasonic processor (from HONDA ELECTRONICS CO., LTD.). Thereafter, the dispersion was mixed with 234 g of polyethylene glycol (PEG, molecular weight: 600, from Sanyo Chemical Industries, Ltd.) at 8000 rpm for 30 minutes with a mixer, and then dried in a dryer at 150° C. to remove water to prepare a composition in which the polyethylene glycol was adsorbed on the expanded graphite.

Next, 470 g of a potassium carbonate ($K_2CO_3$, from Wako Pure Chemical Industries, Ltd., average particle size: 600 µm) was added as an activator to the dried composition, and the mixture was homogeneously mixed with the use of a mill. Furthermore, the obtained mixture was kept at a temperature of 370° C. for 1 hour under a nitrogen atmosphere, then heated to 850° C., and held at a temperature (carbonization/activation temperature) of 850° C. for 1 hour to carry out an activation treatment. Finally, a carbon material was obtained by washing with hot water to neutrality. The polyethylene glycol used was denatured into a resin carbide by this heating treatment, and the obtained carbon material was a composite of the exfoliated graphite and the resin carbide.

The content of the resin carbide in the obtained carbon material was confirmed in the following manner with the use of a differential thermogravimetric simultaneous measurement device (manufactured by Hitachi High-Tech Corporation, trade name "STA7300").

About 2 mg of the carbon material was weighed in a platinum pan. The sample was subjected to measurement from 30° C. to 1000° C. at a rate of temperature increase of 10° C./min under a nitrogen atmosphere. From the differential thermal analysis results obtained by the measurement, the combustion temperatures of the resin (polyethylene glycol) carbide and partially exfoliated graphite were separated, and from the accompanying thermogravimetric change, the amount of the resin carbide (% by weight) with respect to the whole carbon material was calculated. In Example 2, the amount of the resin carbide was 90% by weight.

EXAMPLE 3

A carbon material was obtained in the same manner as in Example 2 except that the activation temperature was changed to 950° C.

EXAMPLE 4

A carbon material was obtained in the same manner as in Example 2 except that the amount of the potassium carbonate added was changed to 94 g.

EXAMPLE 5

With a mixer, 1 g of expanded graphite (from Toyo Tanso Co., Ltd., trade name "PF powder 8", BET specific surface area=22 m²/g), 468 g of a polyethylene glycol (PEG, molecular weight: 400, from Sanyo Chemical Industries, Ltd.), and 23 g of a zinc chloride (from NACALAI TESQUE, INC., average particle diameter: 100 µm) as different particles from the carbon material were mixed at 8000 rpm for 30 minutes, and then dried in a dryer at 150° C. to remove water to prepare a composition in which the mixture of the expanded graphite and the polyethylene glycol was adsorbed on the zinc chloride.

Next, the obtained composition was subjected to a heat treatment at a temperature of 420° C. for 1 hour. Then, the zinc chloride was removed by washing with hot water, thereby providing a carbon material.

COMPARATIVE EXAMPLE 1

As the carbon material, an expanded graphite powder (manufactured by Toyo Tanso Co., Ltd., trade name "PERMA-FOIL PF8") was used as it was.

COMPARATIVE EXAMPLE 2

As the carbon material, carbon nanotubes (CNT, from Showa Denko K.K., trade name "VGCF-H") were used as they were.

COMPARATIVE EXAMPLE 3

As the carbon material, activated carbon (from KURARAY CO., LTD., trade name "KURARAY COAL YP50F") was used as it was.

COMPARATIVE EXAMPLE 4

As the carbon material, ketjen black (from Lion Specialty Chemicals Co., Ltd., trade name "KETJENBLACK EC600JD") was used as it was.

[Evaluation]

The carbon materials according to Examples 1 to 5 and Comparative Examples 1 to 4 were evaluated as follows. The results are shown in Table 1 below.

(Check of Appearance of Carbon Material)

FIG. 1 is a scanning electron microscope (SEM) photograph showing the carbon material obtained in Example 2 at a magnification of 5000. It is to be noted that the SEM photograph was observed with the use of the product number "SU8220" from Hitachi High-Technologies Corporation. As is clear from FIG. 1, it is determined that the carbon material obtained in Example 2 has a plurality of recesses and a plurality of protrusions. Similarly, it has been confirmed that Examples 1, 3, 4, and 5 also have a plurality of recesses and a plurality of protrusions.

FIG. 2 is a scanning electron microscope (SEM) photograph showing the carbon material according to Comparative Example 3 at a magnification of 5000. As is clear from FIG. 2, in the carbon material according to Comparative Example 3 have no plurality of recesses or plurality of protrusions observed as in Example 2.

(BET Specific Surface Area)

The BET specific surface area of the carbon material was measured with the use of a specific surface area measurement device (from Shimadzu Corporation, product number "ASAP-2000", nitrogen gas), and the BET specific surface area was evaluated in accordance with the following evaluation criteria.

[Evaluation Criteria]

Good . . . BET specific surface area of 100 m$^2$/g or more

Poor . . . BET specific surface area of less than 100 m$^2$/g (Confirmation of Presence or Absence of Self-Supporting Film Formation)

The presence or absence of self-supporting film was confirmed as follows.

With 0.2 g of the carbon material packed in a cylindrical syringe of 2 cm in diameter, pressure was gradually applied to the carbon material, and the carbon material was compressed at a pressure of 16 kN for 10 seconds. Subsequently, the whole of the compressed carbon material was taken out from the syringe and put in a stainless-steel sieve (inner diameter: 150 mm, depth: 45 mm) with an aperture of 4.75 mm in accordance with ITIS Z8801-1. Next, with the use of a sieve shaker (from AS ONE CORPORATION, product number "SHAKER SSR-2"), the sieve was shaken at a speed of 60 rpm for 1 minute in RECIPROCATOR mode, the weight of the carbon material remaining on the sieve was then measured, and the presence or absence of film formation was evaluated in accordance with the following evaluation criteria.

[Evaluation Criteria]

Good . . . The weight of the carbon material remaining on the sieve is 90% by weight or more with respect to 100% by weight of the carbon material put into the sieve.

Poor . . . The weight of the carbon material remaining on the sieve is less than 90% by weight with respect to 100% by weight of the carbon material put into the sieve.

Further, FIG. 3 is a photograph showing the carbon material after the application of pressure in Example 2. Furthermore, FIG. 4 is a photograph showing the carbon material after the application of pressure in Comparative Example 3. As is clear from FIG. 3, it is determined that the carbon material according to Example 2 has a self-supporting film formed. In contrast, as is clear from FIG. 4, the carbon material according to Comparative Example 3 failed to have a self-supporting film formed.

Further, the formation state of a circular film of 2 cm in diameter was visually checked for the carbon materials subjected to the application of pressure, obtained in Examples 1 to 5 and Comparative Example 1. In contrast, the carbon materials subjected to the application of pressure, obtained in Comparative Examples 2 to 4, failed to have any self-supporting film formed even in the visual check. The results are shown in Table 1 below.

As is clear from Table 1, it has been successfully confirmed that the carbon materials according to Examples 1 to 5 are capable of forming self-supporting films, large in BET specific surface area, and can increase the capacity of the electrical storage device. In contrast, it is determined that Comparative Examples 1 and 2 are small in BET specific surface area, thus failing to increase the capacity of the electrical storage device. Moreover, it is determined that Comparative Examples 3 and 4 fail to form any self-supporting film, thus failing to form the electrode unless the amount of the binder added is increased.

The invention claimed is:

1. A carbon material comprising a plurality of recesses and a plurality of protrusions,
   wherein the plurality of protrusions are protrusions that fit into the plurality of recesses,
   wherein the carbon material has a BET specific surface area of 100 m$^2$/g or more, and
   wherein a weight of the carbon material remaining on a sieve after shaking is 90% by weight or more with respect to 100% by weight of the carbon material put in the sieve, when 0.2 g of the carbon material packed in a cylindrical syringe of 2 cm in diameter is compressed at a pressure of 16 kN, the whole of the compressed carbon material is taken out from the syringe and put in the sieve with an aperture of 4.75 mm, and the sieve is shaken for 1 minute.

2. The carbon material according to claim 1, wherein the carbon material comprises a carbide of a resin.

3. The carbon material according to claim 1, wherein the carbon material comprises a carbon material that has a graphene laminated structure.

4. The carbon material according to claim 3, wherein the carbon material that has the graphene laminated structure is graphite or exfoliated graphite.

5. The carbon material according to claim 4, wherein the graphite or the exfoliated graphite is partially exfoliated graphite which has a graphite structure and in which graphite is partially exfoliated.

6. An electrode material for an electrical storage device, the electrode material comprising the carbon material according to claim 1.

TABLE 1

| | BET Specific Surface Area (m$^2$/g) | Judgment of BET Specific Surface Area | Shape of Self-supporting Film | Remaining Amount on on Sieve (g) | Remaining Ratio on Sieve (% by weight) | Judgment of Sieve |
|---|---|---|---|---|---|---|
| Example 1 | 1780 | Good | Circular | 0.1908 | 95.4 | Good |
| Example 2 | 920 | Good | Circular | 0.1916 | 95.8 | Good |
| Example 3 | 1200 | Good | Circular | 0.1957 | 97.9 | Good |
| Example 4 | 890 | Good | Circular | 0.1863 | 93.2 | Good |
| Example 5 | 330 | Good | Circular | 0.1874 | 93.7 | Good |
| Comparative Example 1 | 22 | Poor | Circular | 0.1992 | 99.6 | Good |
| Comparative Example 2 | 13 | Poor | Split in flakes | 0.1798 | 89.9 | Poor |
| Comparative Example 3 | 1780 | Good | Powdery | 0 | 0.0 | Poor |
| Comparative Example 4 | 1270 | Good | Circular + Powdery | 0.1365 | 68.3 | Poor |

7. An electrical storage device comprising an electrode made from the electrode material for an electrical storage device according to claim 6.

* * * * *